(No Model.)   2 Sheets—Sheet 1.
J. P. STABLER.
PRESSURE GOVERNOR.
No. 445,348.   Patented Jan. 27, 1891.
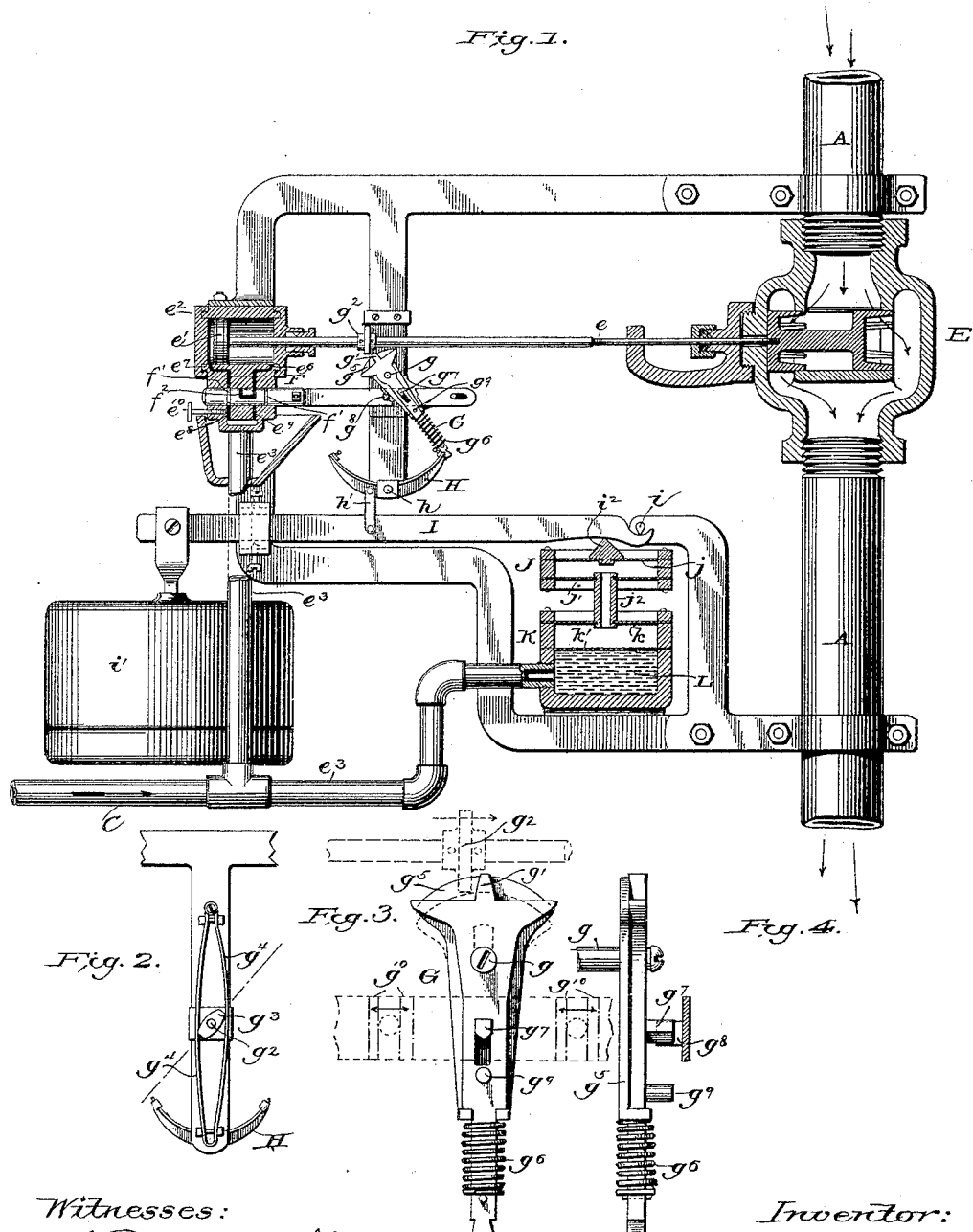
Witnesses:
Inventor:
Jas. P. Stabler
By his atty
Phil T. Dodge (No Model.) 2 Sheets—Sheet 2.
J. P. STABLER.
PRESSURE GOVERNOR.
No. 445,348. Patented Jan. 27, 1891.
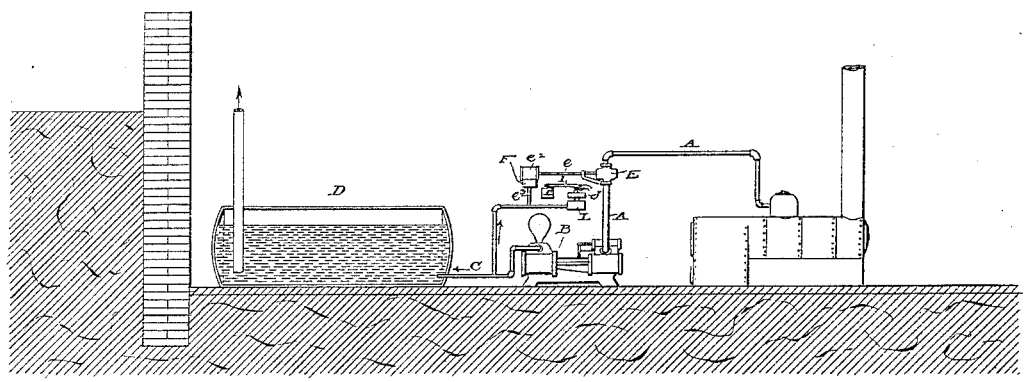
Fig. 5.
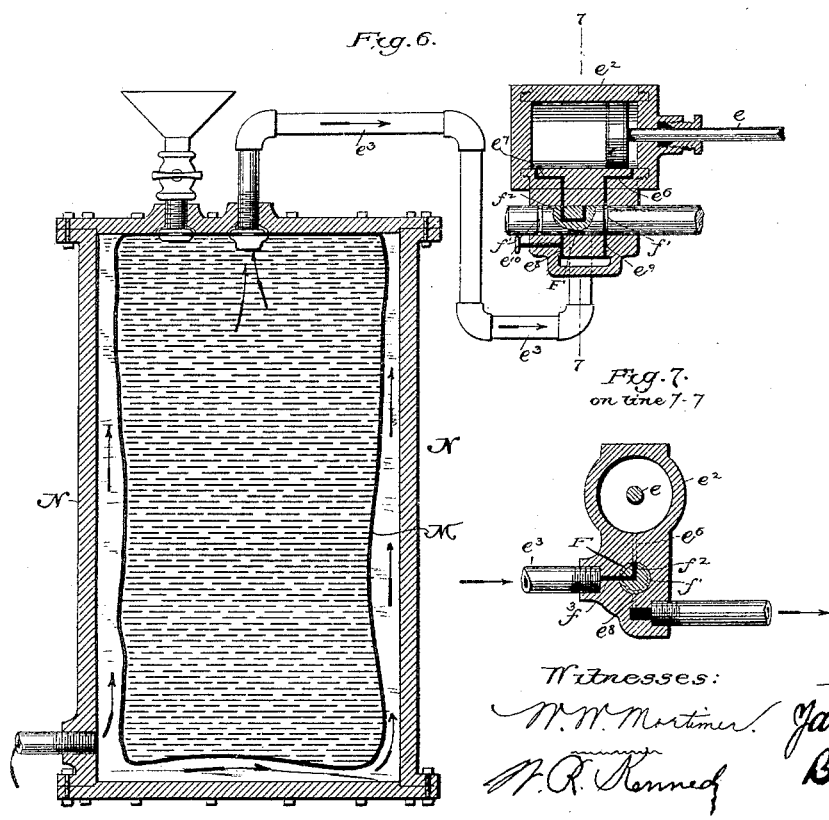
Fig. 6.
Fig. 7.
on line 7-7
Witnesses:
W. W. Mortimer
N. R. Kennedy
Inventor:
Jas. P. Stabler
By his Atty
Phil. T. Dodge

UNITED STATES PATENT OFFICE.

JAMES P. STABLER, OF SANDY SPRING, MARYLAND.

PRESSURE-GOVERNOR.

SPECIFICATION forming part of Letters Patent No. 445,348, dated January 27, 1891.

Application filed July 23, 1890. Serial No. 359,643. (No model.)

*To all whom it may concern:*

Be it known that I, JAMES P. STABLER, of Sandy Spring, in the county of Montgomery and State of Maryland, have invented certain Improvements in Pressure-Governors, of which the following is a specification.

The aim of my invention is to provide for the automatic maintenance of a fixed or unchanging pressure of fluids in places where from any reason the pressure would be liable to vary. To this end I cause the controlled fluid to act upon a suitably-weighted diaphragm, which in turn operates a detent holding in check an independent motor or mechanism for operating a pressure-controlling valve, so that the diaphragm, relieved from the labor of moving the valve, may be made sensitive to very slight changes in pressure. I prefer to use as the motor for moving the main valve a cylinder and piston operated by fluid-pressure from any suitable source and to control this valve-operating piston by a reversing-valve thrown by a spring, the spring being compressed by each movement of the piston and held by the detent until released by the diaphragm. I have therefore illustrated this arrangement in the drawings.

The essence of my invention resides in applying the pressure of the fluid to be controlled to bring into action an independent motor—that is to say, a motor or mechanism deriving its power from sources independent of the diaphragm, which in turn actuates the pressure-controlling valve. This pressure-controlling valve may, as in the present example, control the action of the pump by which the pressure is maintained, or it may be a valve or damper controlling the action of a steam-boiler, or an overflow-valve to limit fluid-pressure, or a valve controlling the delivery of the fluid into the reservoir or other receiver. In short, the system may be used in connection with any valve acting in any manner to determine fluid-pressure. As these special applications of the valve are not of the essence of the present invention and are not in themselves claimed herein, it is considered unnecessary to describe them herein.

In the accompanying drawings, Figure 1 is an elevation of my apparatus applied to control the feed-pump of an elevator. Fig. 2 is a rear elevation of the spring-actuated device by which the reversing-valve is thrown. Fig. 3 is a face view of the same on a larger scale. Fig. 4 is an edge view of the same. Fig. 5 is a diagram illustrating more fully the application of the apparatus as shown in Fig. 1. Fig. 6 is a vertical section through a portion of the apparatus in the form preferred for controlling the pressure of brine or equivalent fluid. Fig. 7 is a vertical cross-section on the line 7 7 of Fig. 6.

Referring to Figs. 1 to 5, A represents a pipe through which steam is delivered to actuate a pump B, which in turn delivers water or other fluid through a pipe C into a tank D, in which it is required to maintain a given pressure.

In the arrangement shown my regulator is controlled by the fluid-pressure in the pipe C and acts in turn to control the delivery of steam through the pipe A to the pump. To this end the pipe A is provided with a throttle-valve E, preferably of the ordinary reciprocating balanced type shown in the drawings. The spindle $e$ of this valve is attached at one end to a piston $e'$ in a stationary cylinder $e^2$. This cylinder communicates through pipe $e^3$ and a valve F (presently to be described) with the pipe C, so that as the fluid is admitted to one side or the other of the piston $e'$ it will move the latter to the right or left and thus open or close the throttle E and stop or start the pump, as the pressure of the fluid under control may demand.

The valve F, hereinafter termed the "reversing-valve," may be of any construction adapted to deliver the fluid to and from the opposite ends of the cylinder $e^2$ alternately. In the form shown it consists of a round spindle provided with two encircling grooves or ports $f'$ and with an intermediate U-shaped port $f^2$, from which a central port $f^3$ opens upward through the side, where it communicates constantly with the supply-pipe $e^3$, as shown in Fig. 7.

The cylinder is provided with two angular ports $e^6$ and $e^7$, leading into opposite ends, and is also provided below the valve F with exhaust-ports $e^8$ and $e^9$. When the valve F is moved to the right, as shown in Fig. 1, it admits the fluid from the pipe $e^3$ through ports $f^3$ and $e^6$ into the right end of the cylinder, causing the piston $e'$ to move to the left and open the steam-throttle, as shown in Fig. 1, the fluid in the left end of the cylinder being at the same time exhausted through the ports $e^7$, $f'$, and $e^8$. When the valve is thrown to the left, as in Fig. 6, the fluid is admitted to the left end of the cylinder and the piston carried to the right, so as to close the steam-throttle and stop the pump. In this second position of the valve the actuating-fluid is admitted through ports $f^2$, $f^3$, and $e^7$, while the fluid in the opposite end of the cylinder is exhausted through ports $e^6$, $f'$, and $e^9$.

In practice it is sometimes desirable to avoid the sudden opening of the steam-throttle. Its opening movement is therefore retarded by checking the escape of the fluid from the left end of the cylinder. This is accomplished by an adjustable screw $e^{10}$ acting to restrict the size of the exhaust-port.

Passing now to the mechanism by which the pressure-fluid is applied to operate the reversing-valve F, G represents a vibrating finger mounted on a pivot $g$ adjacent to the valve-spindle, and having on its upper end a stud $g'$ to engage in the path of the collar $g^2$ on the spindle. The journal $g$ of the finger G is extended through a rigid support and provided on the back, as shown in Fig. 2, with an oblong block $g^3$, resting between the two arms of a spring $g^4$, which tend to maintain the block and the finger in a vertical position. These springs admit of the finger being swung to the right or left, but act to return the finger always to its vertical or pendent position whenever it is released. The finger carries on its back a plate $g^5$, connected to slide lengthwise thereon to a limited extent and urged constantly upward by a spring $g^6$. This plate carries a stud $g^7$, intended to act on a stud $g^8$, fixed to the stem of the reversing-valve, so that as the finger G swings to the right and left the stud $g^7$ will move the reversing-valve, as hereinafter explained. The finger is also provided with a rigid stud $g^9$, intended to act against ribs $g^{10}$ on the reversing-valve to hold the valve to the right or the left.

H represents a crescent-shaped detent or locking-lever pivoted at $h$ and so formed and arranged that one or the other of its ends may be brought into engagement with the end of the vibrating finger, so as to lock the latter in its extreme positions to the right and left, respectively.

The locking-lever H is connected by a link $h'$ to an operating-lever I, having its fulcrum at $i$ and carrying at the free end a weight $i'$. The lever is acted upon and lifted by a knife-edge $i^2$, carried by a flexible diaphragm $j$, forming the top of a chamber J. This chamber is closed and sustained by a bottom diaphragm $j'$, supported by a central tube $j^2$, attached to the upper diaphragm $k$ of a second chamber K, having a bottom diaphragm $k'$, which in turn forms the top of a chamber L, which receives the fluid under control from the standpipe through a branch of the pipe $e^3$, before mentioned.

The action is as follows: Under ordinary conditions the parts stand in the positions shown in Fig. 1, with the throttle or main valve open and the pump in action. The detent holds the finger to the left subject to the pressure of the spring, which tends to throw it down to a vertical position. If for any reason the fluid-pressure exceeds the proper limit, the diaphragms lift the lever, and the latter, through link $h'$, moves the detent, so as to release the finger G. The finger at once falls under the influence of the spring, and its stud $g^7$, acting on the stud $g^8$ of the reversing-valve F, moves the latter to the left. Fluid is thus admitted into the left end of the cylinder and the piston $e'$ forced to the right, thereby closing the main or throttle valve, stopping the pump, and thereby preventing further increase in the pressure. As the piston-rod moves to the right its collar depresses plate $g^5$ and its stud $g^7$, so that the latter may pass the stud $g^8$ on the valve, and while the parts are in this position the collar encounters the projection on the top of the finger and swings the latter to the left against the resistance of the spring until it is engaged by the detent ready for acting again. When the pressure falls, the diaphragm sinks and the weighted lever causes the detent to release the finger, which at once falls to a vertical position and throws the reversing-valve to the right to its original position, thus causing the piston to move to the left and again open the main valve. As the piston moves to the left its collar swings the finger to the right to its first position. (Shown in Fig. 1.) As the finger reaches its extreme position at the right or left its upper end passes beyond the path of the collar, so that the latter may continue its movement. It will be perceived that the finger and spring form jointly an independent motor to move the reversing-valve and that the piston acts to set this motor for action alternately at the right and left. It is manifest that the details may be modified.

It will sometimes happen that the fluid to be controlled is of such character that its direct admission to the cylinder $e^2$ and the reversing-valve is not allowable. In such case I propose, if the fluid under pressure is relied upon to move the piston, to provide, as shown in Fig. 6, a flexible sack M, filled with glycerine or other suitable fluid and connected by a pipe with the reversing-valve and cylinder. This sack I surround by a rigid chamber or vessel N, to which the fluid under control is admitted outside of the sack. The fluid outside of the sack is thus applied to the internal fluid and the latter caused in turn to actuate the piston. From time to time fluid must be supplied to the sack to replace that discharged through the cylinder.

While I prefer in most cases to move the valve-operating piston $e'$ by means of the fluid under control, it is obvious that this is not essential, as fluid under pressure from any source may be used to operate said piston.

By employing the several connected diaphragms shown in the drawings I am enabled to secure the cumulative effect of their movements, or, in other words, a movement of the lever equal to the aggregate movement of the diaphragms. This permits me to secure a long movement of the lever by a very slight movement of the individual diaphragms. It is to be understood, however, that a single diaphragm constructed and arranged in any ordinary manner may be used to operate the lever.

Having thus described my invention, what I claim is—

1. In a fluid-pressure regulator, the combination of a main valve, a motive mechanism to open and close the same, a detent to prevent the action of said mechanism, and an independent weighted diaphragm subject to the pressure of the fluid under control and acting to control the detent, whereby the diaphragm is caused to determine the action of the motor and the latter caused to move the valve.

2. The combination of a main valve, a piston and cylinder to actuate the same, a reversing-valve to control the piston, a spring-motor set by the movement of the piston and acting in turn to move the reversing-valve, and an independent detent to hold the motor, whereby the action of the reversing-valve may be deferred for any required length of time.

3. In a fluid-pressure regulator, a diaphragm subject to the pressure of the controlled fluid, a weight acting on the diaphragm in opposition to said pressure, a pressure-regulating valve, a cylinder and piston to move the same, a reversing-valve to control the action of said piston, a motor to actuate the reversing-valve set for action by the piston, and a detent acting to hold the spring under tension and adapted to be released by the movement of the diaphragm, whereby the diaphragm is relieved from the labor of operating either of the valves.

4. The valve-operating spindle and the cylinder and piston to move the same, in combination with the reversing-valve to control the movement of the piston, the valve-spindle and the stud, the vibrating finger, the spring tending to hold the finger in a middle position, the sliding plate on the finger provided with a stud to throw the reversing-valve, the collar on the piston-rod adapted to swing the finger to the right and left of the middle position and to move the sliding plate upon the finger that the interlocking studs may pass, and the detent to hold the finger.

5. The reciprocating valve-spindle, with its shoulders and the intermediate stud, in combination with the vibrating finger having the stud to engage the shoulders and lock the spindle, the spring to throw the finger to a central position, the sliding plate, with its stud mounted on the finger, the spring acting on said plate, means for swinging the finger positively to and fro, and the detent to hold the finger to the right and left.

6. In a fluid-pressure regulator, the valve-operating piston and the compressible sack communicating therewith and containing an operating-fluid, in combination with the chamber inclosing said sack and means for supplying fluid to said chamber outside of the sack.

In testimony whereof I hereunto set my hand, this 18th day of July, 1890, in the presence of two attesting witnesses.

JAMES P. STABLER.

Witnesses:
PHILIP T. DODGE,
W. R. KENNEDY.